(12) United States Patent
Hoshi

(10) Patent No.: US 8,887,449 B2
(45) Date of Patent: Nov. 18, 2014

(54) BENCHMARK MARKING TOOL AND BENCHMARK MARKING METHOD

(75) Inventor: Isao Hoshi, Hiratsuka (JP)

(73) Assignee: Toshiba Plant Systems & Services Corporation, Yokohama-shi (JP)

( * ) Notice: Subject to any disclaimer, the term of this patent is extended or adjusted under 35 U.S.C. 154(b) by 836 days.

(21) Appl. No.: 12/935,154

(22) PCT Filed: Mar. 25, 2009

(86) PCT No.: PCT/JP2009/055882
§ 371 (c)(1),
(2), (4) Date: Sep. 28, 2010

(87) PCT Pub. No.: WO2009/119625
PCT Pub. Date: Oct. 1, 2009

(65) Prior Publication Data
US 2011/0010956 A1   Jan. 20, 2011

(30) Foreign Application Priority Data
Mar. 28, 2008   (JP) ................. 2008-087863

(51) Int. Cl.
*E04B 1/00* (2006.01)
*G01C 15/04* (2006.01)
*E04H 13/00* (2006.01)
*G01B 3/00* (2006.01)

(52) U.S. Cl.
CPC . *G01C 15/04* (2013.01); *G01B 3/00* (2013.01); *E04H 13/003* (2013.01)
USPC .............. 52/105; 52/103; 52/746.1; 116/209; 116/240

(58) Field of Classification Search
CPC .......... E04H 13/003; G01B 3/00; B23P 25/00
USPC .................. 52/105, 25, 38, 33, 103, 295, 20, 52/254–257; 116/209, 240, 325, 326, 305, 116/335
See application file for complete search history.

(56) References Cited

U.S. PATENT DOCUMENTS 191,919 A * 6/1877 Bonner ........................... 52/103
242,418 A * 5/1881 Schuyler ..................... 40/124.5
(Continued)

FOREIGN PATENT DOCUMENTS

DE   20 2005 001 150 U1   7/2006
JP   59 25413   2/1984
(Continued)

OTHER PUBLICATIONS

International Preliminary Report on Patentability dated Dec. 2, 2010 in corresponding International Application No. PCT/JP2009/055882 filed on Mar. 25, 2009 (submitting English translation only).

(Continued)

*Primary Examiner* — Phi A
(74) *Attorney, Agent, or Firm* — Oblon, Spivak, McClelland, Maier & Neustadt, L.L.P.

(57) ABSTRACT

A benchmark marking tool includes a marking plate having an upper surface formed in a flat shape so as to mark a benchmark on the upper surface, a stud extending from a back surface of the upper surface of the marking plate and buried in a structure such as a floor of a building to fix the marking plate, and an outer peripheral flange provided around the marking plate and buried in a coating layer applied to the structure. The marking plate is provided such that the upper surface is located to be flush with or below an upper surface of the coating layer formed on the structure when the marking plate is located in the structure of the building.

5 Claims, 7 Drawing Sheets

(56) References Cited

U.S. PATENT DOCUMENTS

| | | | | |
|---|---|---|---|---|
| 595,038 | A * | 12/1897 | Branzke | 52/38 |
| 1,272,430 | A * | 7/1918 | Hanson | 40/124.5 |
| 1,950,298 | A * | 3/1934 | Frost | 40/124.5 |
| 2,154,966 | A * | 4/1939 | Vanderveer | 52/103 |
| 2,687,788 | A | 8/1954 | Rapp | |
| 2,733,785 | A * | 2/1956 | Beatty | 52/239 |
| 3,063,199 | A * | 11/1962 | Marcin | 52/38 |
| 3,481,089 | A * | 12/1969 | Sheidow | 52/103 |
| 3,503,163 | A * | 3/1970 | Lutz | 52/103 |
| 3,650,072 | A * | 3/1972 | Matvey | 52/102 |
| 3,709,188 | A * | 1/1973 | Coupar | 52/163 |
| 3,758,999 | A * | 9/1973 | Matvey | 52/103 |
| 3,927,637 | A * | 12/1975 | Sammaritano | 33/1 H |
| 3,964,219 | A * | 6/1976 | Hala | 52/105 |
| 4,403,459 | A * | 9/1983 | Hurlbut | 52/103 |
| 4,578,910 | A * | 4/1986 | Germeroth et al. | 52/105 |
| 5,056,454 | A * | 10/1991 | Turner | 116/209 |
| 5,079,848 | A * | 1/1992 | Oshiro et al. | 33/392 |
| 5,186,119 | A * | 2/1993 | Hlavin | 116/222 |
| 5,771,835 | A * | 6/1998 | Schneider | 116/209 |
| 6,425,212 | B1 | 7/2002 | Lovazzano | 52/105 |
| 6,904,721 | B1 * | 6/2005 | Forbes | 52/103 |
| 7,232,236 | B2 * | 6/2007 | Vitense et al. | 362/153 |
| 7,930,859 | B1 * | 4/2011 | Eslambolchi et al. | 52/103 |
| 8,453,416 | B2 * | 6/2013 | Brindle | 52/854 |
| 2004/0031214 | A1 * | 2/2004 | Fong et al. | 52/103 |
| 2006/0167648 | A1 | 7/2006 | Ohtani | |

FOREIGN PATENT DOCUMENTS

| | | |
|---|---|---|
| JP | 7-43157 A | 2/1995 |
| JP | 08-312108 A | 11/1996 |
| JP | 9 89566 | 4/1997 |
| JP | 09-089566 | 4/1997 |
| JP | 2004 36185 | 2/2004 |
| JP | 2005-226123 | 8/2005 |
| JP | 3119721 | 2/2006 |
| JP | 2006-322174 A | 11/2006 |
| JP | 3128556 | 1/2007 |
| KR | 20-0335815 | 12/2003 |
| RU | 2206066 C1 | 6/2003 |
| SD | 1186947 A1 | 10/1985 |
| WO | 2005 017644 | 2/2005 |

OTHER PUBLICATIONS

International Search Report issued May 12, 2009 in PCT/JP09/055882 filed Mar. 25, 2009.

Extended European Search Report issued Aug. 21, 2012 in Patent Application No. 09726053.3.

Office Action in corresponding Korean patent Application N. 2010-7021894 issued Aug. 14, 2012.

Office Action in corresponding Kazakhstani Patent Application No. 2010/1624.1 issued Sep. 13, 2012.

* cited by examiner

BENCHMARK MARKING TOOL AND BENCHMARK MARKING METHOD

TECHNICAL FIELD

The present invention relates to a technique for setting a benchmark as a reference point for locating a structural member such as a wall member in construction working of a building, and more particularly, to a benchmark marking tool and to benchmark marking method.

BACKGROUND ART

There is known a conventional benchmark marking tool including a plate fixed to a structural member of a building through a nailing or screwing working and a benchmark information sheet removably attached to the plate so as to facilitate installation and removal thereof (for example, see Patent Document 1 (Japanese Patent Laid-Open No. 09-089566)).

A plurality of reference points are set to locate structural members in a construction site of a building. For example, when a wall member is located inside the building, one reference point is set on a floor or the like of each floor, and a reference point is set at each position inside the building based on the reference point. Such reference points are called benchmarks, which are important references for determining a position of a structural member during a construction period. Particularly, in a large building such as a power plant which requires a longer time for construction than ordinary houses, the benchmark marking tool needs to be fixed rigidly so as to maintain a benchmark over a long period.

In the conventional benchmark marking tool, the fixing plate is nailed or screwed to the structure of the building. Thus, even when it takes a long time to construct the building, the benchmark can be maintained at a set position over the construction period.

The benchmark marking tool is mostly detached from the structure to be removed during or after completion of the construction working because the benchmark marking tool becomes an obstruction to carriage of equipment into the building or spoils appearance of the structure in the construction of the building. As the benchmark marking tool is fixed to the structure more rigidly, a larger workload is imposed by the removing operation.

In the conventional benchmark marking tool, the structure may crack in a nailed or screwed portion, and a gap is formed between a base material of the structure and the benchmark marking tool, which may result in damage of water tightness of the structure. That is, the conventional benchmark marking tool is not preferably usable for a building of a facility for which high water tightness is required. Particularly, in a radioactive material handling facility or the like including a nuclear power plant, a structure needs to have high water tightness such that a radioactive material attached to a floor surface or a wall surface does not penetrate deep into the attachment portion.

The conventional benchmark marking tool cannot be applied to such a facility.

DISCLOSURE OF THE INVENTION

The present invention has been made in view of the circumstances mentioned above, and an object of the present invention is to provide a benchmark marking tool and a benchmark marking method, in which a benchmark is maintained at a predetermined set position over a construction period of a building, the marking tool does not need to be removed, and water tightness of a structure is maintained.

To achieve the above object, a benchmark marking tool of the present invention includes:

a marking plate having an upper surface in a flat shape to which a benchmark is marked; a stud extending from a back surface of the upper surface of the marking plate and buried in a structure of a building to fix the marking plate; and an outer peripheral flange provided around the marking plate and buried in a coating layer formed on the structure, wherein the marking plate is provided such that the upper surface thereof is located to be flush with or below an upper surface of the coating layer of the structure when the marking plate is located in the structure of the building.

In a preferred embodiment, an upper surface of the outer peripheral flange may be provided with a groove formed in a circumferential direction of the outer peripheral flange.

It may be desired that the stud extends from the back surface of the upper surface of the marking plate and is bent in a direction different from an extending direction thereof so as to form a bent portion.

The marking plate may be made of stainless steel and the stud may be made of carbon steel and coated with a material having a corrosion resistance higher than that of the carbon steel.

The outer peripheral flange may be provided in parallel or with an inclination with respect to a floor surface, and a plurality of the outer peripheral flanges may be provided around the marking plate.

In another aspect, a method of marking a benchmark of the present includes the steps of: preparing a countersunk screw provided with a head portion having a upper flat surface on which a benchmark is marked; and fitting a threaded portion of the countersunk screw into a structure of a building by adjusting the countersunk screw such that the upper surface of the head portion is located to be flush with or below an upper surface of a coating layer applied to the structure when the countersunk screw is located in the structure.

According to the present invention, the benchmark is maintained at a predetermined set position over the construction period of a building, it is nor required for the marking tool to be removed, and the water tightness of the structure can be also maintained.

BRIEF DESCRIPTION OF THE DRAWINGS

FIG. 1 illustrates a benchmark marking tool according to a first embodiment, in which

FIG. 4 is a view explaining an operation of the benchmark marking tool, in which

FIG. 5 illustrates a benchmark marking tool according to a second embodiment of the present invention, in which

FIG. 7 is a view explaining an operation of the benchmark marking tool, in which

FIG. 8 illustrates variations of the benchmark marking tool, in which

BEST MODE FOR CARRYING OUT THE INVENTION

Embodiments of a benchmark marking tool according to the present invention will be described hereunder with reference to the accompanying drawings.

First Embodiment

FIG. 1 are views illustrating a benchmark marking tool 10 according to a first embodiment.

Figure 1A:
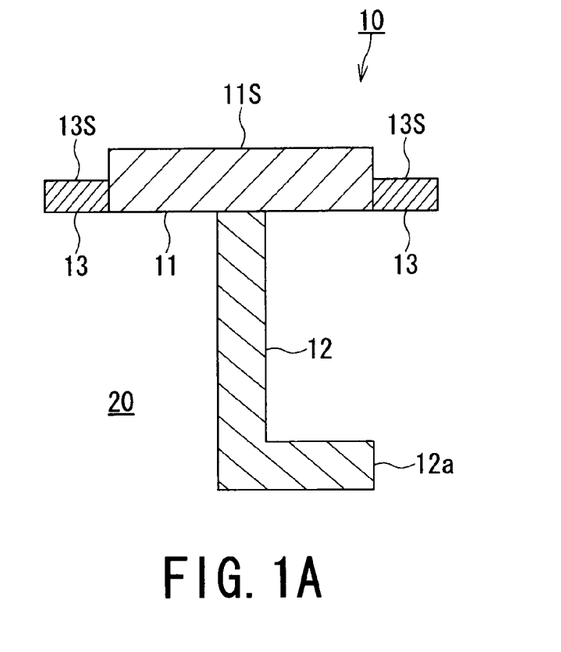
FIG. 1A is a sectional view and FIG. 1B is a plan view.

The benchmark marking tool 10 according to the present embodiment includes a marking plate 11, a stud 12 and an outer peripheral flange 13 as shown in FIG. 1A.

Figure 1B:
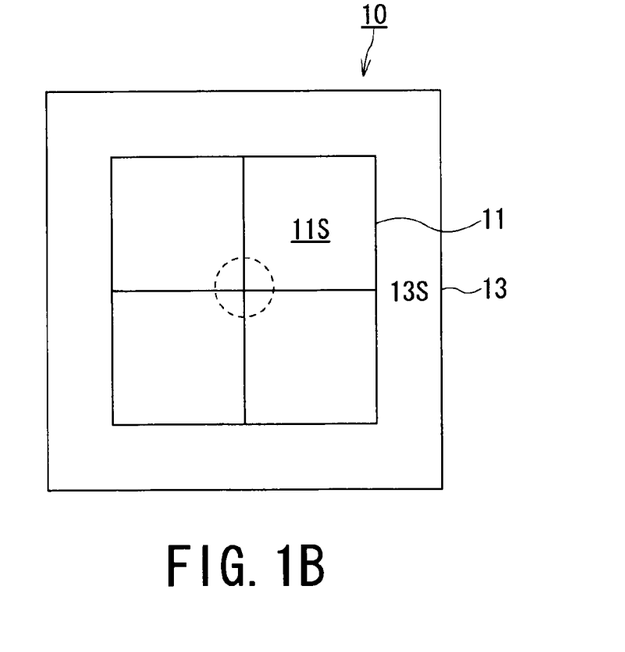

The marking plate 11 of the benchmark marking tool 10 is a benchmark holding member and is used for marking a reference point during a construction period of a building. A benchmark, having information such as an actual measurement value from a reference level, a guide line showing a distance from a base line and dimensions, is marked on an upper surface 11S of the marking plate 11. FIG. 1B is a plan view showing the benchmark in a simplified manner.

The marking plate 11 is a square stainless steel plate having 50 mm per side. The upper surface 11S is formed in a flat shape. A shape of a portion other than the upper surface 11S of the marking plate 11 is set according to design specifications. Although a material for the marking plate 11 is not limited to any specific material, when the marking plate 11 is made of stainless steel, the marking plate 11 provides excellent corrosion resistance and effectively extended operating life as the benchmark holder.

The outer peripheral flange 13 of the benchmark marking tool 10 attains a sealing function of hermetically sealing a gap formed between the benchmark marking tool 10 installed in a structure such as a floor and a structure base material. The outer peripheral flange 13 is provided so as to surround an entire periphery of the marking plate 11 as shown in FIG. 1B. The outer peripheral flange 13 is formed integrally with the marking plate 11 during a manufacturing process. The outer peripheral flange 13 has an outer frame length of 70 mm, and is set to project 10 mm from each side of the marking plate 11. Although the outer peripheral flange 13 is not limited to a particular shape and size, the outer peripheral flange 13 of the benchmark marking tool 10 is provided so as to surround the entire periphery of the marking plate 11 in consideration of the sealing function.

A length from an upper surface 13S of the outer peripheral flange 13 to the upper surface 11S of the marking plate 11 is set to 2 mm. The length is appropriately set in consideration of a thickness of a coating material applied to the structure to which the benchmark marking tool 10 is applied.

The stud 12 of the benchmark marking tool 10 extends from a back surface of the upper surface (lower surface opposite to the upper surface) 11S in which the benchmark is marked in the marking plate 11, and is buried in a floor for fixing the marking plate 11. The stud 12 is made of carbon steel having a round bar shape of 8 mm in diameter. The stud 12 may be also coated with a material having corrosion resistance higher than that of the carbon steel.

The stud 12 includes a bent portion 12a bent in a direction different from an extending direction at a middle position as shown in FIG. 1A. The dimension and shape of the stud 12 is not specifically limited. A fixing capability of the marking plate 11 is improved by bending the stud 12 at the middle position.

The benchmark marking tool 10 is installed in a concrete floor 20 in which a coating material is applied to the structure in consideration of water tightness such as in a nuclear power plant building.

Figure 2:
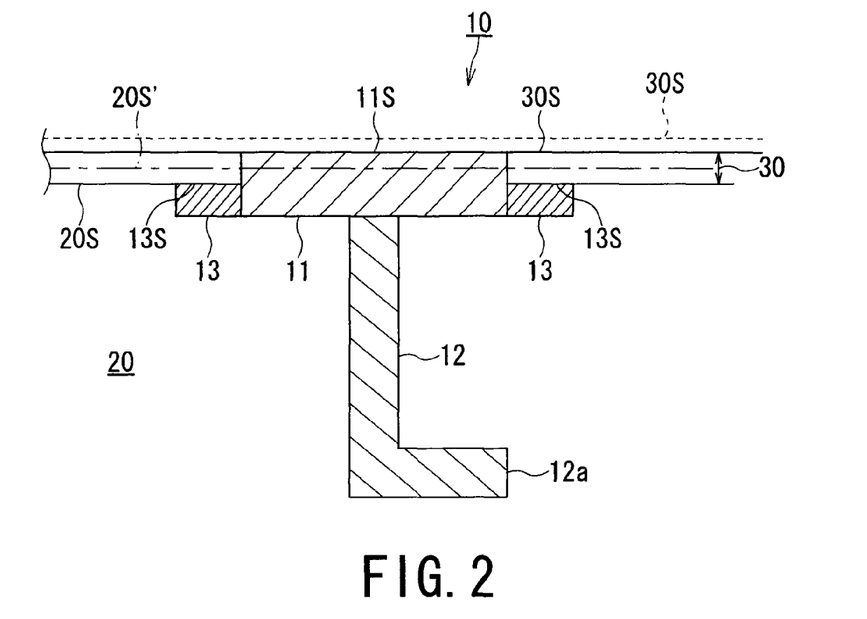
FIG. 2 is a sectional view of a floor to which the benchmark marking tool is placed.

FIG. 2 is a sectional view of the floor to which the benchmark marking tool 10 is provided.

The marking plate 11 of the benchmark marking tool 10 is provided in a manner such that the upper surface 11S is flush with an upper surface 30S of a coating layer 30 as shown in FIG. 2. Alternatively, in order to improve the water tightness of the floor 20 by coating, the upper surface 11S of the marking plate 11 may be located below the upper surface 30S of the coating layer 30. A dash line in FIG. 2 indicates the upper surface 30S of the coating layer 30 in the case where the upper surface 11S of the marking plate 11 is provided below the upper surface 30S of the coating layer 30. A thickness of the coating layer 30 is appropriately set, based on specifications, to 2 mm in the present embodiment. That is, the thickness is set to the same as the length between the upper surface 13S of the outer peripheral flange 13 and the upper surface 11S of the marking plate 11 of the benchmark marking tool 10.

The outer peripheral flange 13 of the benchmark marking tool 10 is provided in the coating layer 30 as shown in FIG. 2. Alternatively, in order to improve the fixing capability of the benchmark marking tool, the outer peripheral flange 13 may be provided in the concrete floor 20. An alternate long and short dash line in FIG. 2 indicates an upper surface 20S' of the floor 20 in a case where the upper surface 13S of the outer peripheral flange 13 is provided below the upper surface 20S of the floor 20.

Hereunder, operations of the benchmark marking tool 10 will be described.

Before describing the function of the benchmark marking tool, it would be required to explain how the present invention has been attained.

A conventional benchmark marking tool is composed of a plate fixed by driving a fixing tool such as a nail and a screw into a structure of a building, and an information sheet detachably attached to a body of the plate.

This configuration of the conventional benchmark marking tool is based on an object to easily facilitate installation and removal thereof. However, this configuration becomes necessary to detach the plate from the structure to remove the benchmark marking tool. The water tightness of the structure may be damaged due to a gap formed between the fixing tool such as a nail and a screw for fixing the benchmark marking tool and a base material of the structure.

To obviate such damage as mentioned above, there has been proposed a method of marking a benchmark using a countersunk screw.

Figure 3:
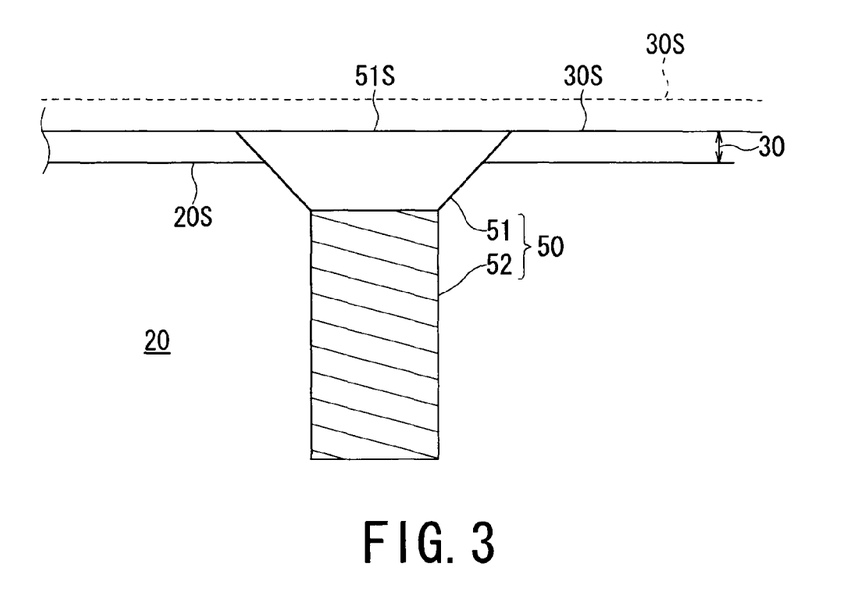
FIG. 3 is an explanatory view of a method for marking a benchmark proposed in view of conventional problems.

FIG. 3 is an explanatory view of the method for marking a benchmark proposed in view of the conventional technology mentioned above.

In the method for marking a benchmark, the benchmark marking tool is formed by preparing a countersunk screw 50 having a head portion 51 having a flat upper surface 51S and marking a benchmark on the upper surface 51S of the head portion 51. In the method for marking a benchmark, a threaded portion 52 is fitted into the floor 20 while adjusting the countersunk screw 50 such that the upper surface 51S of the head portion 51 is flush with the upper surface 30S of the coating layer 30 of the floor 20 when the countersunk screw 50 is located in the floor 20 as shown in FIG. 3.

Alternatively, in order to improve the water tightness of the floor 20, the threaded portion 52 is fitted into the floor 20 while adjusting the countersunk screw 50 such that the upper surface 51S of the head portion 51 is located below the upper surface 30S of the coating layer 30.

A dash line in FIG. 3 indicates the upper surface 30S of the coating layer 30 in a case where the upper surface 51S of the head portion 51 is provided below the upper surface 30S of the coating layer 30.

Functions of the method of marking a benchmark will be described hereunder with respect to "fixing operation", "flushing operation" and "gap sealing operation".

"Fixing Operation"

Since, the benchmark marking tool is composed of the countersunk screw 50, when a vertical force is applied to the benchmark marking tool, the benchmark marking tool is braked by a threading interaction between the threaded portion 52 and the floor 20. Hence, the benchmark marking tool is rigidly fixed to the floor 20 in comparison with the case of fixing the marking tool by using a nail or a screw. Therefore, even if it takes a long time to construct a building, the benchmark can be maintained at a set position over the construction period.

"Flushing Operation"

The head portion 51 of the countersunk screw 50 has the upper surface 51S formed in a flat shape. The threaded portion 52 is fitted in a manner of adjusting the countersunk screw 50 such that the upper surface 51S of the head portion 51 is located to be flush with or below the upper surface 30S of the coating layer 30. Thus, when the coating has been completed, the upper surface of the benchmark marking tool, i.e., the upper surface 51S of the head portion 51, is flush with the upper surface 30S of the coating layer 30 of the floor 20.

Although, in the conventional technology, the benchmark marking tool may constitute an obstruction to carriage of equipment into the building or may spoil appearance of the structure in the construction of the building, it becomes not necessary, according to the above embodiment, to remove the benchmark marking tool by detaching the same from the structure during or after the completion of the construction of the building.

"Gap Sealing Operation"

Figure 4A:
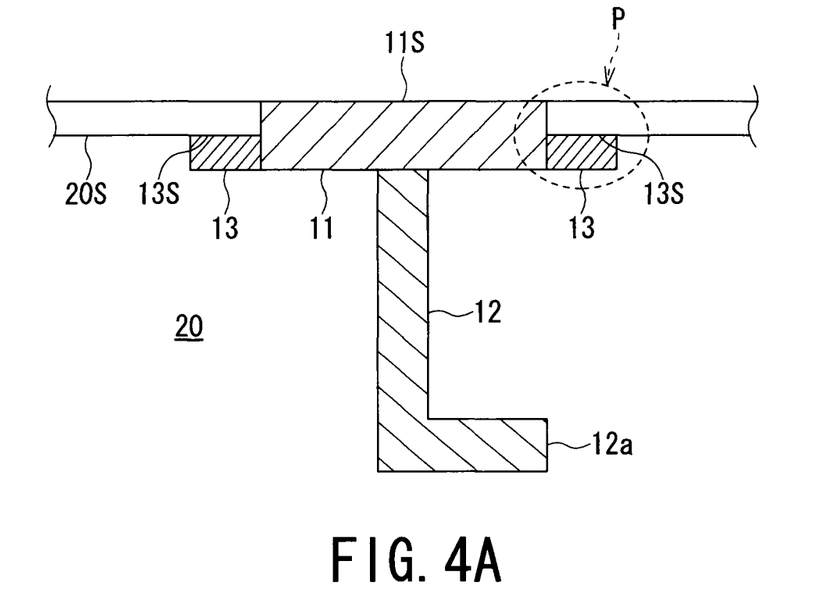
FIG. 4A is a sectional view of the floor to which the benchmark marking tool is placed and FIG. 4B is an enlarged view of a P portion in FIG. 4A.
Figure 4B:
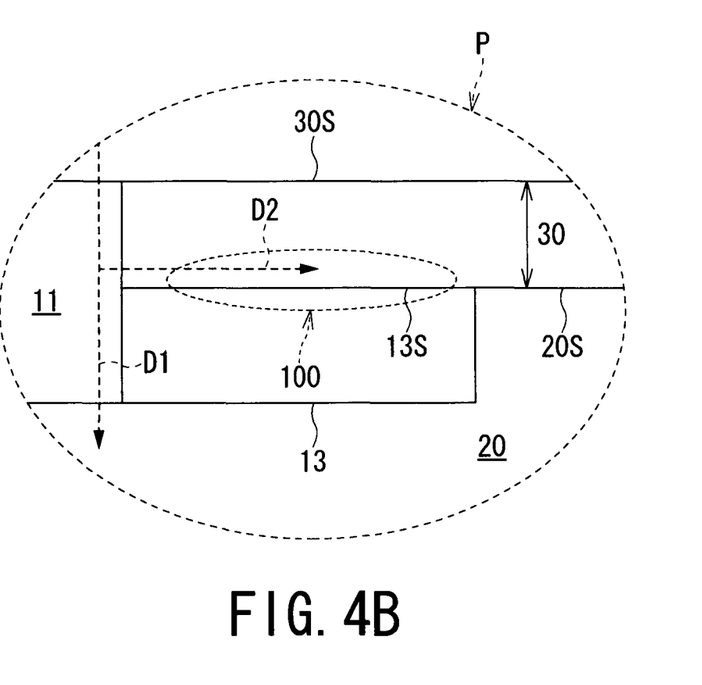

A sealing portion (corresponding to a portion shown with reference numeral 100 in FIG. 4B) is formed between each of the head portion 51 and the threaded portion 52 of the countersunk screw 50 by the use of adhesion characteristics of the coating material applied to the floor 20. Accordingly, an effective benchmark marking tool can be realized for a building having a structure for which high water tightness is required, such as a radioactive material treating facility, for example, a nuclear power plant.

As a result, the benchmark is maintained at a predetermined set position over the construction period of the building. Moreover, any operation for removing the benchmark marking tool is not needed, and the high water tightness of the structure can be maintained.

In the radioactive material treating facility such as, for example, a nuclear power plant, however, there is a demand to further improve the sealing function in an assumption of a case where the benchmark marking tool is not removed.

The benchmark marking tool for 10 according to the present invention (see FIG. 2) can satisfy such a demand.

In the following, "fixing operation", "flushing operation" and "gap sealing operation" of the benchmark marking tool 10 according to the embodiment mentioned above of the present invention will be described.

"Fixing Operation"

The benchmark marking tool 10 includes the stud 12 extending from the back surface of the upper surface 11S of the marking plate 11 and buried in the floor 20 so as to fix the marking plate 11. Accordingly, occurrence of crack in the structure that may be caused when the benchmark marking tool is nailed or screwed can be avoided, so that the benchmark marking tool 10 can be rigidly fixed to the floor 20.

"Flushing Operation"

The benchmark marking tool 10 includes the marking plate 11 in which the upper surface 11S is formed in a flat shape and the benchmark is marked on the upper surface 11S.

The benchmark marking tool 10 is provided in a state that, under the condition that the marking plate 11 is arranged in the floor 20, the upper surface 11S of the marking plate 11 is located to be flush with or below the upper surface 30S of the coating layer 30 applied to the floor 20. Thus, when the coating has been completed, the upper surface 11S of the marking plate 11 of the benchmark marking tool 10 becomes flush with the upper surface 20S of the floor 20 in a similar manner to the case of constructing the benchmark marking tool with the countersunk screw 50 (see FIG. 3).

Although, in the conventional technology, the benchmark marking tool may constitute an obstruction to carriage of equipment into the building or may spoil appearance of the structure in the construction of the building, it becomes not necessary, according to the above embodiment, to remove the benchmark marking tool by detaching the same from the structure during or after the completion of the construction of the building.

"Gap Sealing Operation"

FIG. 4 includes views for explaining the operation of the benchmark marking tool 10, in which FIG. 4A is a sectional view of the floor where the benchmark marking tool 10 is installed, and FIG. 4B is an enlarged view of a P portion in FIG. 4A.

In FIG. 4B, an arrow D1 indicates a pathway of invading water in a case in which the benchmark marking tool 10 with no outer peripheral flange 13 is installed in the floor 20. An arrow D2 indicates a pathway of invading water in a case in which the benchmark marking tool 10 provided with the outer peripheral flange 13 is installed in the floor 20. The outer peripheral flange 13 of the benchmark marking tool 10 is provided around the marking plate 11 and buried in the coating layer 30.

For example, in the radioactive material treating facility such as a nuclear power plant, the upper surface 30S of the coating layer 30 is sometimes cleaned up for the purpose of washing away a radioactive material adhering to the upper surface 30S. At this time, in the benchmark marking tool 10 with no outer peripheral flange 13, there is a fear such that washing water containing a radioactive material may invade from a gap formed between the benchmark marking tool 10 and the coating layer 30 and seep deeply into the floor base material made of concrete having a relatively high porosity. As a result, there is a fear that inside and outside of the building of a facility may be contaminated by the radioactive material.

Meanwhile, in the benchmark marking tool 10 provided with the outer peripheral flange 13, the sealing portion 100 is formed in the gap between the coating layer 30 and the outer peripheral flange 13. That is, the sealing function of the benchmark marking tool 10 using the adhesion of the coating material applied to the floor 20 is improved by providing the outer peripheral flange 13. Thus, for example, when a floor in a nuclear power plant is cleaned up, a seeping speed of cleaning water containing a radioactive material deeply into the base material of the floor 20 from the upper surface 30S of the coating layer 30 is decreased, which results in easy trapping of the radioactive material.

The provision of the benchmark marking tool 10 will attain the following advantageous effects.

(1) The benchmark marking tool 10 includes: the marking plate 11 in which the upper surface 11S is formed in a flat shape and the benchmark is marked on the upper surface 11S; the stud 12 extending from the back surface of the upper surface 11S of the marking plate 11 and buried in the floor 20 so as to fix the marking plate 11; and the outer peripheral flange 13 provided around the marking plate 11 and buried in the coating layer 30.

In such benchmark marking tool 10, the marking plate 11 is provided such that the upper surface 11S thereof is located to be flush with or below the upper surface 30S of the coating layer 30 formed on the floor 20 when the marking plate 11 is located in the floor 20. Accordingly, the benchmark is maintained at a predetermined set position over the construction period of the building. Moreover, it is not necessary for the benchmark marking tool to be removed, and the water tightness of the structure can be effectively maintained.

(2) The stud 12 of the benchmark marking tool 10 extends from the back surface of the upper surface 11S of the marking plate 11 and is bent in a direction different from the extending direction to form the bent portion 12a. Thus, even in a case when a vertical force is applied to the benchmark marking tool 10, the bent portion 12a of the benchmark marking tool is engaged with the base material of the floor 20, thus further improving the fixing function in comparison with a case in which the bent portion 12a is not provided.

Second Embodiment

In a second embodiment, the configuration of the outer peripheral flange 13 of the benchmark marking tool 10 according to the first embodiment is modified. The same components as those in the first embodiment are assigned with the same reference numerals and duplicated explanation is hence omitted herein, and components changed from or newly added to the configuration of the first embodiment are shown by adding character "A" at the end of each reference numeral.

Figure 5A:
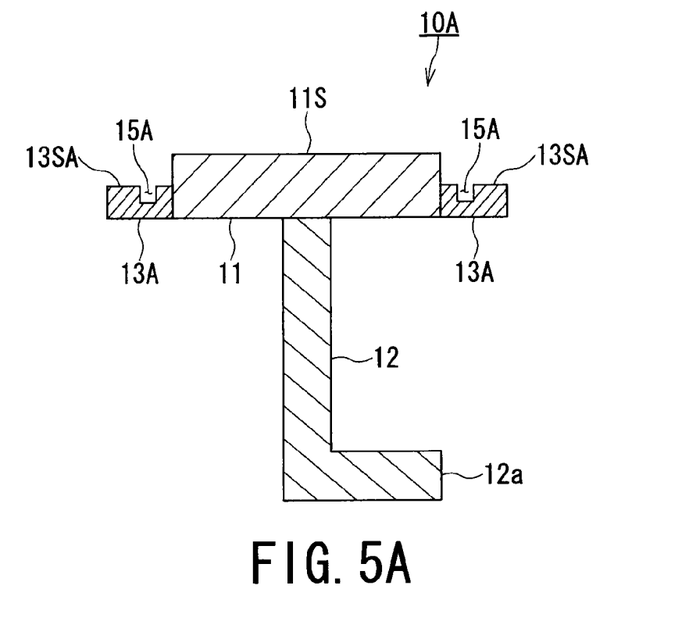
FIG. 5A is a sectional view and FIG. 5B is a plan view.
Figure 5B:
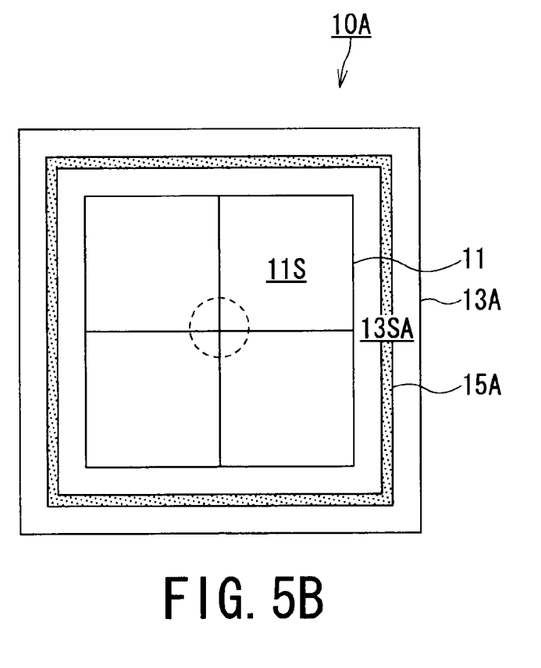

FIG. 5 includes views illustrating a benchmark marking tool 10A according to the second embodiment, in which FIG. 5A is a sectional view, and a FIG. 5B is a plan view.

A groove 15A is formed in an upper surface 13SA of an outer peripheral flange 13A of the benchmark marking tool 10A in a circumferential direction of the outer peripheral flange 13A as shown in FIGS. 5A and 5B. The groove 15A may be formed so as to show any shape. For example, the groove 15A may be formed so as to smoothly curve in consideration of stress resistance performance. Although the groove 15A does not always need to be formed over an entire periphery of the outer peripheral flange 13A, in this embodiment, the groove 15A is formed over the entire periphery of the outer peripheral flange 13A to improve the gap sealing function.

Figure 6:
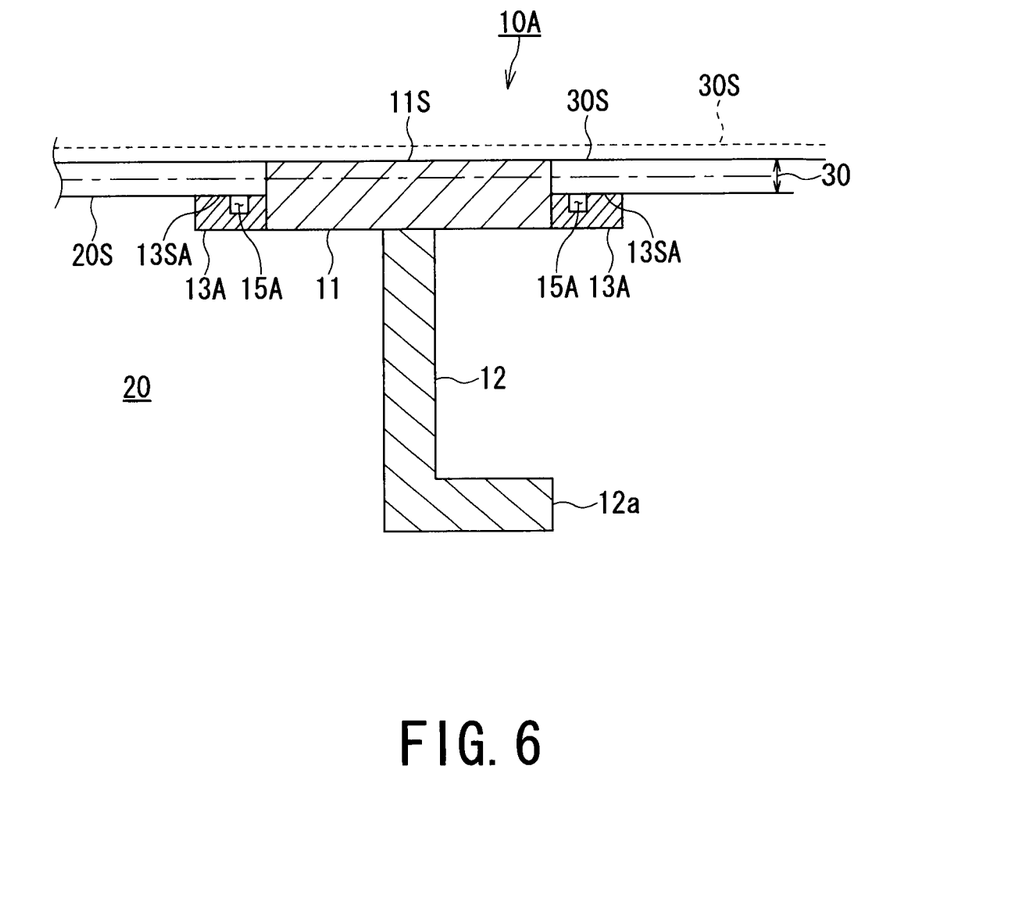
FIG. 6 is a sectional view of a floor to which the benchmark marking tool is placed.

FIG. 6 is a sectional view of the floor 20 to which the benchmark marking tool 10A is installed.

The outer peripheral flange 13A of the benchmark marking tool 10A is buried in the coating layer 30 as shown in FIG. 6. Alternatively, the outer peripheral flange 13A may be buried in the concrete floor 20 to improve the fixing capability of the benchmark marking tool 10A. An alternate long and short dash line in FIG. 6 indicates the upper surface 20S of the floor 20 in the case where the upper surface 13SA of the outer peripheral flange 13A is provided below the upper surface 20S of the floor 20.

Hereunder, the function of the benchmark marking tool 10A will be described.

Figure 7A:
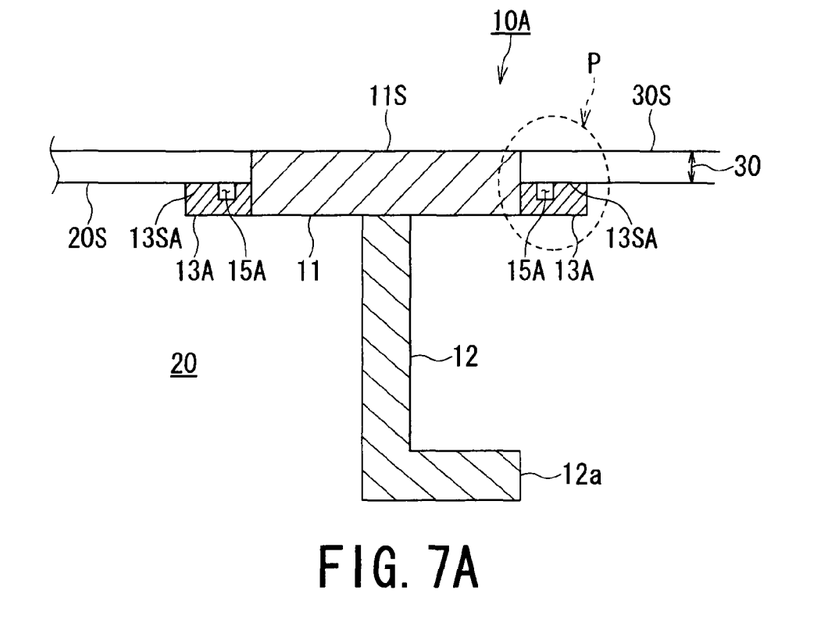
FIG. 7A is a sectional view of the floor to which the benchmark the marking tool is placed and FIG. 7B is an enlarged view of a P portion in FIG. 7A.
Figure 7B:
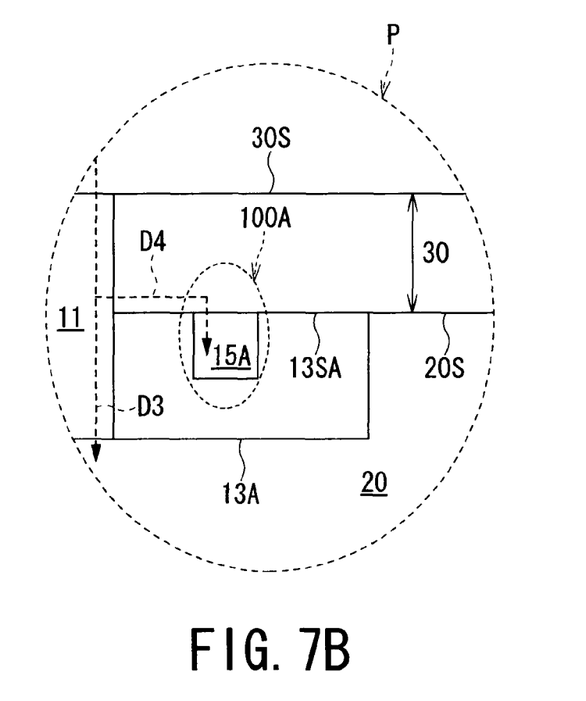

FIG. 7 includes views for explaining function and operation of the benchmark marking tool 10A, in which FIG. 7A is a sectional view of the floor 20 to which the benchmark marking tool 10A is installed, and FIG. 7B is an enlarged view of a portion P.

In FIG. 7B, an arrow D3 indicates a pathway of invading water in a case in which the benchmark marking tool with no outer peripheral flange is installed on the floor 20. An arrow D4 indicates a pathway of invading water in a case in which the benchmark marking tool 10A is provided with the outer peripheral flange 13A installed on the floor 20.

In the benchmark marking tool 10A provided with the outer peripheral flange 13A, a sealing portion 100A is formed between the coating layer 30 and the outer peripheral flange 13A, and the groove 15A is formed in the outer peripheral flange 13A. For this arrangement, a contacting area between the outer peripheral flange 13A and the coating layer 30 is increased in comparison with the case in which the groove 15A is not formed. That is, the sealing performance utilizing the adhesion characteristics of the coating material applied to the floor 20 is improved in comparison with the first embodiment. Since other operations and functions are the same as those of the first embodiment, the duplicated description thereof is omitted herein.

Hereunder, the advantageous effects of the benchmark marking tool 10A will be described.

The benchmark marking tool 10A can produce a following effect in addition to the effects (1) and (2) in the first embodiment.

(3) The groove 15A is formed in the upper surface of the outer peripheral flange 13A of the benchmark marking tool 10A in the circumferential direction of the outer peripheral flange 13A. Accordingly, the sealing performance is further improved, and the benchmark marking tool 10A can be installed while maintaining the structure at high water sealing performance.

It is to be noted that although the benchmark marking tool according to the present invention was described above with reference to the first and second embodiments, the specific structures of the present invention are not limited to these embodiments, and many other changes, additions and modification in design or like may be made without departing from the scope of the appended claims of the present invention.

Figure 8A:
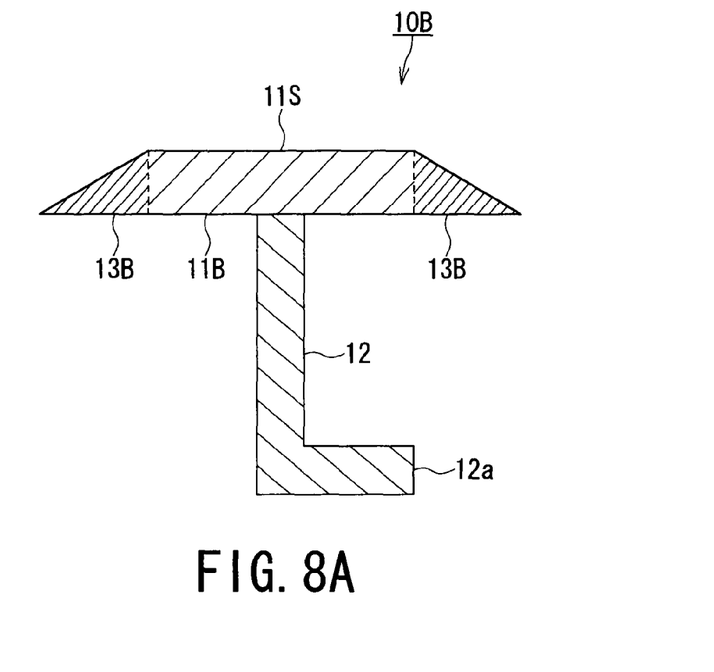
FIG. 8A is a view illustrating an example in which a shape of an outer peripheral flange is modified.
Figure 8B:
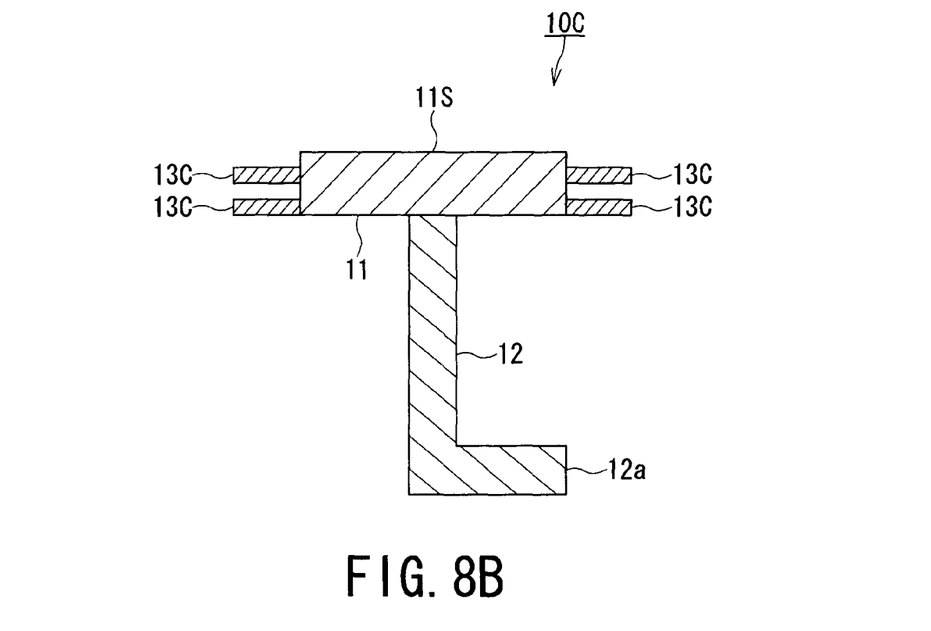
FIG. 8B is a view illustrating an example in which the number of outer peripheral flanges is changed.

FIG. 8 shows variations of the benchmark marking tool, in which FIG. 8A is a view illustrating an example of the outer peripheral flange having modified shape, and FIG. 8B is a view illustrating an example in which the number of outer peripheral flanges is changed.

Although in the described embodiments, the outer peripheral flange of the benchmark marking tool is provided with inclination parallel to the floor surface, the outer peripheral flange is not limited to a particular shape, and as shown in FIG. 8A, the outer peripheral flange may provide a trapezoid shape in section by the marking plate 11 and an outer peripheral flange 13B. According to this configuration, a benchmark marking tool 10B may be easily worked and formed.

Furthermore, in the described embodiment, although the example in which the single outer peripheral flange is provided on the single benchmark marking tool is described, the number of the outer peripheral flanges is not limited thereto. For example, in order to improve the gap sealing performance and the fixing performance of the benchmark marking tool, two outer peripheral flanges 13C may be provided on a single benchmark marking tool 10C as shown in FIG. 8B. Three or more outer peripheral flanges may be also provided.

Still furthermore, in the described embodiment, the example in which the stud of the benchmark marking tool is provided with the bent portion bent in one direction is described, the shape of the stud is not limited thereto. For example, in order to improve the fixing performance of the benchmark marking tool, the stud may be bent in a plurality of directions at a distal end, or the number of studs may be increased.

The invention claimed is:

1. A benchmark marking tool provided for a structure of a building on a surface of which a coating layer is formed comprising:
 a marking plate having an upper surface in a flat shape to which a benchmark is marked;
 a stud extending from a back surface of the upper surface of the marking plate and configured to be buried in a structure of a building to fix the marking plate to the surface of the structure;
 an outer peripheral flange provided entirely around the marking plate in a manner such that an upper surface of the outer peripheral flange positioned below an upper surface level of the marking plate, and
 a seal portion formed between an upper surface of the outer peripheral flange and the coating layer formed on the surface of the structure when the marking plate is buried in the structure,
 wherein, in a state in which the benchmark making tool is provided for the structure of a building on which the coating layer is formed, the upper surface of the marking plate is arranged so as to take a position to be flush with or below the upper surface level of the coating layer formed on the structure of a building, and the upper surface of the outer peripheral flange is buried in the structure of the building to thereby form a seal portion at a boundary to the coating.

2. The benchmark marking tool according to claim 1, wherein an upper surface of the outer peripheral flange is provided with a groove formed in a circumferential direction of the outer peripheral flange.

3. The benchmark marking tool provided for a structure of a building on which a coating layer is formed according to claim 1, wherein the stud extends from the back surface of the upper surface of the marking plate and is bent in a direction different from an extending direction thereof so as to form a bent portion.

4. The benchmark marking tool provided for a structure of a building on which a coating layer is formed according to claim 1, wherein the marking plate is made of stainless steel and the stud is made of carbon steel and coated with a material having a corrosion resistance higher than that of the carbon steel.

5. A method of marking a benchmark provided for a structure of a building on a surface of which a coating layer is formed comprising the steps of:
 preparing a countersunk screw provided with a countersunk-shaped head portion having a upper flat surface on which a benchmark is marked for marking a benchmark to a structure of a building;
 forming a coating layer on the surface of the structure; and
 fitting a threaded portion of the countersunk screw into a structure of a building by adjusting the countersunk screw in a manner such that the upper surface of the head portion is located to be flush with or below an upper surface of a coating layer so as to form a seal portion at a boundary to the coating layer of the structure of the building when the countersunk screw is located in the structure.

* * * * *